R. W. CHARLTON.
AUGER.
APPLICATION FILED OCT. 18, 1920.
1,389,578. Patented Sept. 6, 1921.
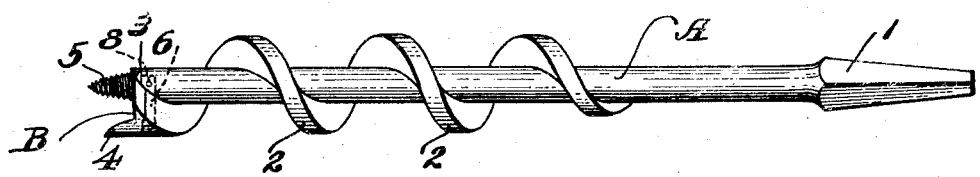
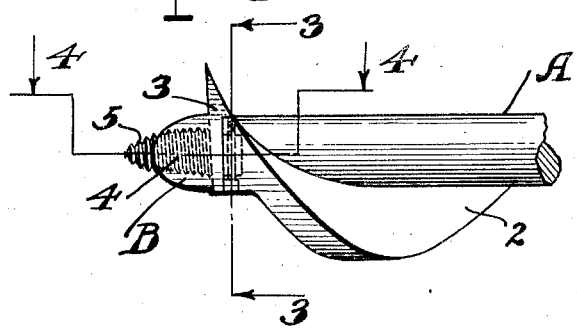
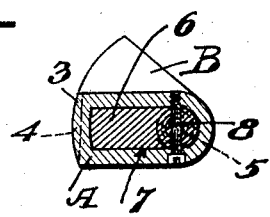
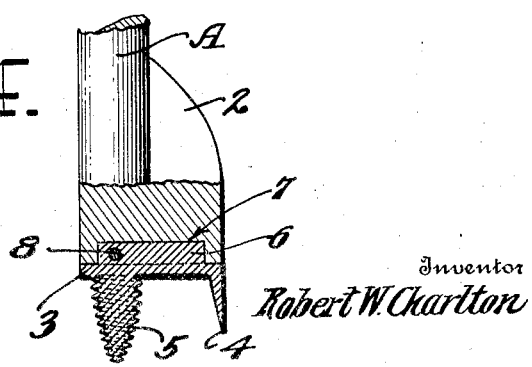
Witness:
E. H. Wagner
Inventor
Robert W. Charlton
By Robb, Robb & Hill
Attorneys

UNITED STATES PATENT OFFICE.

ROBERT W. CHARLTON, OF PINEVILLE, LOUISIANA, ASSIGNOR OF ONE-HALF TO HARRY MAIRUS, OF RAPIDES PARISH, LOUISIANA.

AUGER.

1,389,578.  Specification of Letters Patent.  Patented Sept. 6, 1921.

Application filed October 18, 1920. Serial No. 417,544.

*To all whom it may concern:*

Be it known that I, ROBERT W. CHARLTON, a citizen of the United States, residing at Pineville, in the parish of Rapides and State of Louisiana, have invented certain new and useful Improvements in Augers, of which the following is a specification.

My invention relates to augers, and particularly to augers intended for wood working commonly termed "bits."

It is the main object of my invention to provide an auger comprising several interdependent parts, each part admitting of instant replacement and permitting of manufacture from materials best suited for the purpose, yet possessing, when assembled, the strength of an integral construction.

It is an additional object of my invention to provide means whereby to rigidly unite the several parts of the auger and to construct each part so that when joined to form the complete tool, the strain incident to operation will be distributed and balanced in a manner preventing distortion of the parts and their tendency to work loose.

It is a further object of my invention to provide means whereby the cutting head of the auger may be constructed independently of and separate from the body or shank, which latter also serves as a discharge conveyer, the assembly of the body and head readily accomplished and without possibility of error in their arrangement.

I attain all of these objects and other objects which will become apparent in the specification to follow and will be specifically referred to in the claims hereto appended, by the device illustrated in the accompanying drawing in which:—

Figure 1 is a side elevation of the complete auger;

Fig. 2 is an enlarged elevation of the cutter head and a portion of the shank;

Fig. 3 is a section on the line 3—3 of Fig. 2 looking in the direction of the arrow; and Fig. 4 is a section on the line 4—4 of Fig. 2.

Similar numerals refer to similar parts throughout the several views.

As has already been indicated my auger comprises a body or shank A, a cutter head B and a locking means therebetween.

The shank or body A has the usual angular faces 1 at one end to facilitate holding in a brace or other tool holding device and for the purpose of providing a discharge means from the cutter head, it is spirally formed, the spiral formation 2 being herein also referred to as the conveyer screw.

The cutter head B of my device comprises a body 3 of elongated form, but of less length than the diameter of the shank A, and is provided with the ordinary or usual vertical and horizontal cutter lips and worm or screw point, the vertical cutter 4 and the worm 5 being arranged at opposite ends thereof.

The abutting ends or faces of the shank A and the cutter head B are both perpendicular or substantially perpendicular to the axis of the auger, so that when the two parts are joined in the manner to be hereinafter referred to, the abutting faces are flush one with another.

Carried by the cutter head and midway between the outer or inner extremities of its abutting face is a rib 6 rectangular in shape, and which is adapted to be inserted into a recess or socket 7 in the shank A.

Said recess extends inwardly of the body or shank A and the spiral formation 2 from its face abutting the cutter head B and is shaped with relation to the rib 6 and to provide a snug fit therefor. Both the shank and rib are transversely bored to receive a fastening member or screw 8 adapted to be inserted therethrough when the cutter head B is properly seated in shank or body A.

As the screw point of the cutter head works inwardly the cutter lips therein chip and cut away material which must be discharged. It has already been indicated that the screw or body A is spirally formed to provide a discharge means. The cutter head B is, of course, joined to the shank A in such a manner that the discharge passage is rendered continuous therefrom.

Energy applied to operate the auger is expended in forcing the screw point or worm 5 inwardly of the material and in causing the cutter lips to penetrate and cut away the material within its path. As these functions are all performed by the cutter head B, the entire strain of operating the auger necessarily rests within or upon this part, but the strain is not centered upon any particular point within the cutter head but extends from its axis of revolution to its outermost cutting edge.

It is for this reason that the rib 6 has been formed in the manner heretofore described, and for this same reason that the recess socket 7 is positioned upon the substantially rectangular end or abutting face of the shank or body B intermediate the outermost edge of the conveyer screw 2 and the innermost portion of said shank or body.

In the drawing appended I have illustrated the rib 6 as rectangular in cross section, but this particular form of rib is not essential as other shapes therefor as, for example, one of increased thickness at the outer end thereof, are equally effective.

The shape of the cutter head being such that when it is correctly set upon the shank or body a continuous discharge passage is formed therewith eliminates the necessity for other means to prevent incorrect association of these parts. Nor is the need for other means apparent especially in view of the fact that it is universally known that the screw point of an auger should form the axis of its revolution, yet it is feasible in my auger to arrange the screw holes in the shank and rib so that unless the shank and head are correctly joined the screw member 8 can not be inserted therethrough, which arrangement is clearly shown in the drawing.

From this description it is manifest that the construction of my device is such that it has the strength of an integrally formed auger. In addition thereto, it possesses the advantages of a take-apart construction which admits of the bead being made of one material and the shank of another. The purpose of each part being wholly different, this is a distinct advantage in favor of an auger with a detachable cutter head, especially when considered in connection with the opportunity to replace either part independent of the other.

While I have illustrated and described the preferred form of my auger, limitations as to its construction are not intended, for modifications, changes and alterations within the scope of the claims are to be resorted to when desired.

Having thus described my invention, what I claim as new and desire to secure by Letters Patent is:—

1. An auger, comprising a shank having a spiral screw formation upon the same, said shank terminating at one end in a socket the recess of which is disposed off center with respect to the longitudinal axis of the shank, and a detachable cutter head provided with a screw point and scoring lip at one side and a tang offset from the other side intermediate said cutter screw and lip adapted to fit in said recess.

2. An auger comprising a shank provided with a spiral conveyer screw winding thereabout and terminating at one end of said shank at one side thereof, said shank and conveyer screw having a socket formed in their coterminus ends which extends radially with respect thereto, and a cutterhead having a rib fitting snugly in said socket and coöperating with the walls thereof to prevent movement of said cutter-head in any direction transverse to the axis of said shank, said cutter-head having a portion forming a continuation, and the cutting lip, of said conveyer screw and a screw point in axial alinement with said shank.

In testimony whereof I affix my signature.

ROBERT W. CHARLTON.